(12) United States Patent
Jay et al.

(10) Patent No.: US 12,425,450 B2
(45) Date of Patent: Sep. 23, 2025

(54) METHOD FOR SECURING DIGITAL SUBSTATIONS AND SYSTEM THEREOF

(71) Applicant: GRIDSENTRY PRIVATE LIMITED, Karnataka (IN)

(72) Inventors: Devika Jay, Kerala (IN); Himanshu Goyel, Navi Mumbai (IN); Amulya Sreejith, Kerala (IN); Rajesh Rathi, Karnataka (IN)

(73) Assignee: GRIDSENTRY PRIVATE LIMITED, Karnataka (IN)

( * ) Notice: Subject to any disclaimer, the term of this patent is extended or adjusted under 35 U.S.C. 154(b) by 84 days.

(21) Appl. No.: 18/584,436

(22) Filed: Feb. 22, 2024

(65) Prior Publication Data

US 2024/0323228 A1    Sep. 26, 2024

(30) Foreign Application Priority Data

Feb. 22, 2023  (IN) .............................. 202341012168

(51) Int. Cl.
 *H04L 9/40*   (2022.01)
(52) U.S. Cl.
 CPC ...... *H04L 63/1491* (2013.01); *H04L 63/1416* (2013.01)
(58) Field of Classification Search
 CPC ............. H04L 63/1491; H04L 63/1416; H04L 63/1466
 See application file for complete search history.

(56) References Cited

U.S. PATENT DOCUMENTS

| | | | | |
|---|---|---|---|---|
| 7,283,476 B2* | 10/2007 | Bare | ....................... | H04L 69/22 370/254 |
| 7,990,994 B1* | 8/2011 | Yeh | ..................... | H04L 12/4641 711/147 |
| 11,652,889 B2* | 5/2023 | Zhu | ....................... | H04L 45/306 709/227 |

* cited by examiner

*Primary Examiner* — Sm A Rahman
(74) *Attorney, Agent, or Firm* — George Likourezos; Carter, DeLuca & Farrell LLP

(57) ABSTRACT

The present disclosure relates to securing digital substation. A switching node is configured to connect a decoy network and a substation communication network. Further, a plurality of bogus medium access control (MAC) IDs are created that resembles similar to a plurality of critical media access control (MAC) IDs exchanged between a plurality of intelligent electronic devices (IEDs) present in the substation communication network. Furthermore, the plurality of bogus MAC IDs are provided to the decoy network for communicating with the alien device. In this way, one or more malicious attack requests received from the alien device are detected. Further, the switching node may switch the substation network to the decoy network for displaying a set of bogus MAC IDs to the alien device depending on type of the one or more malicious attack requests.

18 Claims, 7 Drawing Sheets

METHOD FOR SECURING DIGITAL SUBSTATIONS AND SYSTEM THEREOF

TECHNICAL FIELD

The present disclosure relates to the technical field of electric power grid security systems, in particular to systems and methods for securing electric power grid operations from cyber intrusions.

BACKGROUND OF INVENTION

The following description includes information that may be useful in understanding the present disclosure. It is not an admission that any of the information provided herein is prior art or relevant to the present disclosure, or that any publication specifically or implicitly referenced is prior art.

Electric power substations are critical elements of the power grid, installed with power system components such as transformers, busbars, and circuit breakers arranged to ensure reliable and adequate transmission and distribution of electric power. Measurements from substations, such as from Intelligent Electronic Devices (IEDs), are used as input to Energy Management System (EMS) software applications along with state estimation and optimal power flow for monitoring and control of the electric system.

In digital substations, microprocessor-based Intelligent Electronic Devices (IEDs) are used to control power system switching devices such as circuit breakers, reclosers, etc. With the standardization by the International Electrotechnical Commission (IEC) of the IEC 61850 process bus, most modern IEDs now support voltage and current inputs in a digital format, as Sampled Value (SV) streams transmitted as Ethernet packets on the process bus. In implementations according to the IEC61850-9-2 specifications, a merging unit (MU) is the device that samples the analog measurements (voltages and currents) of the primary high voltage power circuit, encodes the measurement values into Ethernet packets, and injects them onto the process bus. The IED receives these SV packets from the process bus, processes them, and uses the SV as the inputs to its various fault detection and protection functions.

The IED thus operates on the basis of measured signals (e.g., voltages and currents, etc.) from attached sensors, signals from other IEDs indicating the state of their controlled elements, and signals from a supervisory system. The IED can also generate signals to act on its switching elements, to communicate its state to other IEDs or to inform the supervisory system. These signals are either hardwired or transmitted as network messages, for instance according to IEC 61850.

One key function of the IED is to detect that a fault happens on the primary circuit and to issue a "trip" command to activate a switching device and thus disconnect the faulty parts of the circuit. During this process, the analog inputs to the MUs and the resulting digitized SV packets are critical to the proper operation decision of the IEDs.

The use of digitized sample value streams and Ethernet technology opens the doors to cyber-attacks on the digitized sample value data. An attacker, once gaining access to the process bus or to a merging unit, can modify the SV packets received by the corresponding IED, and thus can manipulate the protection system and, potentially, cause serious consequences to the power grid. For example, a false trip on normally healthy circuits could cause the system to weaken in such a way that might lead to localized or regional grid collapse.

In addition to its primary protection function, the IEDs can include a control function for direct operation, whereby the IED executes commands from the operator, in particular to open and close assigned switching elements. An operator can initiate a control command from the Control Center (CC), the Station Human-Machine Interface (HMI), or the Local HMI on the front of the IED. Alternatively, the command can also be executed by directly manipulating a protection device control data object in the IEC 61850 hierarchy, by gaining access to the station bus.

Remote access to substation networks is a common way for control and maintenance of substation facilities. However, there is a potential cyber-security issue in remote access operation. An unauthorized direct control attack to important substations may be used to open multiple circuit breakers, for example, which could trigger multiple, cascaded sequences of events, leading to a blackout. As a result, it is crucial to enhance the cyber security of substations and analyze cyber security and physical security as one integrated structure, to enhance the resilience of power grids.

IEC-61850 standard does not specify security features to address these cyber threats on substation communication network. Further, IEC-62351 standard was published to address this security gap in GOOSE. As per IEC 62351 recommendation, the use of encryption techniques for GOOSE are not recommended. Thus, an unencrypted communication channel exists between the substation devices which makes it vulnerable to attacks.

Accordingly, improved techniques and devices are needed for securing digital substations against malicious attacks.

SUMMARY OF INVENTION

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In an aspect, the present disclosure relates to a method for securing digital substation. The method includes configuring a switching node to connect a decoy network and a substation communication network. Further, the method includes creating a plurality of bogus medium access control (MAC) IDs, resembling similar to a plurality of critical media access control (MAC) IDs exchanged between a plurality of intelligent electronic devices (IEDs) present in the substation communication network. Furthermore, the method includes providing the plurality of bogus MAC IDs to the decoy network for communicating with the alien device. Moreover, the method includes detecting, by the switching node, the one or more malicious attack requests received from the alien device. In response to detection of the one or more malicious attack requests, the switching node may switch the substation network to the decoy network for displaying a set of bogus MAC IDs to the alien device depending on type of the one or more malicious attack requests. Further, the switching node may determine one or more attack features based on activity performed by the alien device in response to the set of bogus MAC IDs. The one or more attack features are determined to evaluate an attack plan and/or the plurality of IEDs to be targeted by the alien device.

In an exemplary embodiment, the decoy network is a mirror of the substation communication network and is deployed to entertain one or more malicious attack requests received through an alien device. The decoy network comprises an analyst, a master, an informer, and an agent. The decoy network comprises the agent and the informer to replicate behavior of a station bus layer and a process bus layer present in the substation communication network respectively, wherein the station bus layer and the process bus layer are connected to a plurality of Intelligent Electronic Devices (IEDs). The plurality of IEDs comprises at least one bay controller unit, at least one protection relay, a phase data concentrator, a wide area control unit, analog and digital measuring unit, and at least one condition monitoring device.

In another exemplary embodiment, the activity performed by the alien device in response to the set of bogus MAC IDs is either manipulation or deletion of the bogus MAC IDs of the decoy network. The plurality of bogus MAC IDs is altered periodically to provide illusion of dynamic nature of the substation communication network to the alien device.

In yet another exemplary embodiment, detecting the one or more malicious attack requests is performed by monitoring an unauthorized access to the substation communication network. The unauthorized access to the substation communication network is detected based on comparing internet Protocol (IP) address and MAC address of the alien device with a pre-established access control whitelist, and if the IP address and the MAC address of the alien device does not belong to the pre-established access control whitelist, determining the IP address, the MAC address as a suspicious IP address, an MAC address and detecting one or more requests generated by the suspicious IP address and MAC address as the unauthorized access to the substation communication network.

In still another exemplary embodiment, the method further includes activating the decoy network only in response to the one or more malicious attack requests detected from the alien device, wherein the activated decoy network is configured to interact with the alien device using the plurality of bogus MAC IDs. Furthermore, the method includes delaying response to the one or more malicious attack requests based on the determination of the one or more attack features.

In an exemplary embodiment, the plurality of bogus MAC IDs are altered periodically to provide illusion of dynamic nature of the substation communication network to the alien device.

In another exemplary embodiment, the activity performed by the alien device in response to the set of bogus MAC IDs is either manipulation or deletion of the bogus MAC IDs of the decoy network.

In yet another exemplary embodiment, the agent mimics a process bus layer with Sampled Value (SV) messages and Generic Object Oriented Substation Events (GOOSE).

In still another exemplary embodiment, the master, at a station bus level, initiates a response plan upon detection of the one or more malicious attacks and maintains alarm and event logs of the agent and the informer.

In another aspect, the present disclosure relates to a switching node for securing digital substations. The switching node includes a controller. The controller may connect the decoy network and the substation communication network. The decoy network is a mirror of the substation communication network and is deployed to entertain one or more malicious attack requests received through an alien device. The controller may create the plurality of bogus medium access control (MAC) IDs, resembling similar to the plurality of critical media access control (MAC) IDs exchanged between the plurality of intelligent electronic devices (IEDs) present in the substation communication network. The controller may provide the plurality of bogus MAC IDs to the decoy network for communicating with the alien device. The controller may detect the one or more malicious attack requests received from the alien device. In response to detection of the one or more malicious attack requests, the controller may switch the substation communication network to the decoy network for displaying the set of bogus MAC IDs to the alien device depending on type of the one or more attack requests. Further, the controller may determine one or more attack features based on activity performed by the alien device in response to the set of bogus MAC IDs.

In yet another aspect, the present disclosure relates to a system for securing digital substations. The system includes the substation communication network, the decoy network, and the switching node. The substation communication network comprising a station bus layer and a process bus layer. The station bus layer and the process bus layer are connected to a plurality of Intelligent Electronic Devices (IEDs). The decoy network comprising the agent and the informer to replicate behavior of the station bus layer and the process bus layer present in the substation communication network respectively. The decoy network is the mirror of the substation communication network and is deployed to entertain one or more malicious attack requests received through an alien device. The switching node coupled to the substation communication network and the decoy network. The switching node is configured to create the plurality of bogus medium access control (MAC) IDs, resembling similar to the plurality of critical media access control (MAC) IDs exchanged between the plurality of intelligent electronic devices (IEDs) present in the substation communication network. Further, the switching node is configured to provide the plurality of bogus MAC IDs to the decoy network for communicating with the alien device. Furthermore, the switching node is configured to detect the one or more malicious attack requests received from the alien device. In response to detection of the one or more malicious attack requests, the switching node is further configured to switch the substation communication network to the decoy network for displaying the set of bogus MAC IDs to the alien device depending on type of the one or more attack requests. Furthermore, the switching node may determine one or more attack features based on activity performed by the alien device in response to the set of bogus MAC IDs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which.

Figure 1:
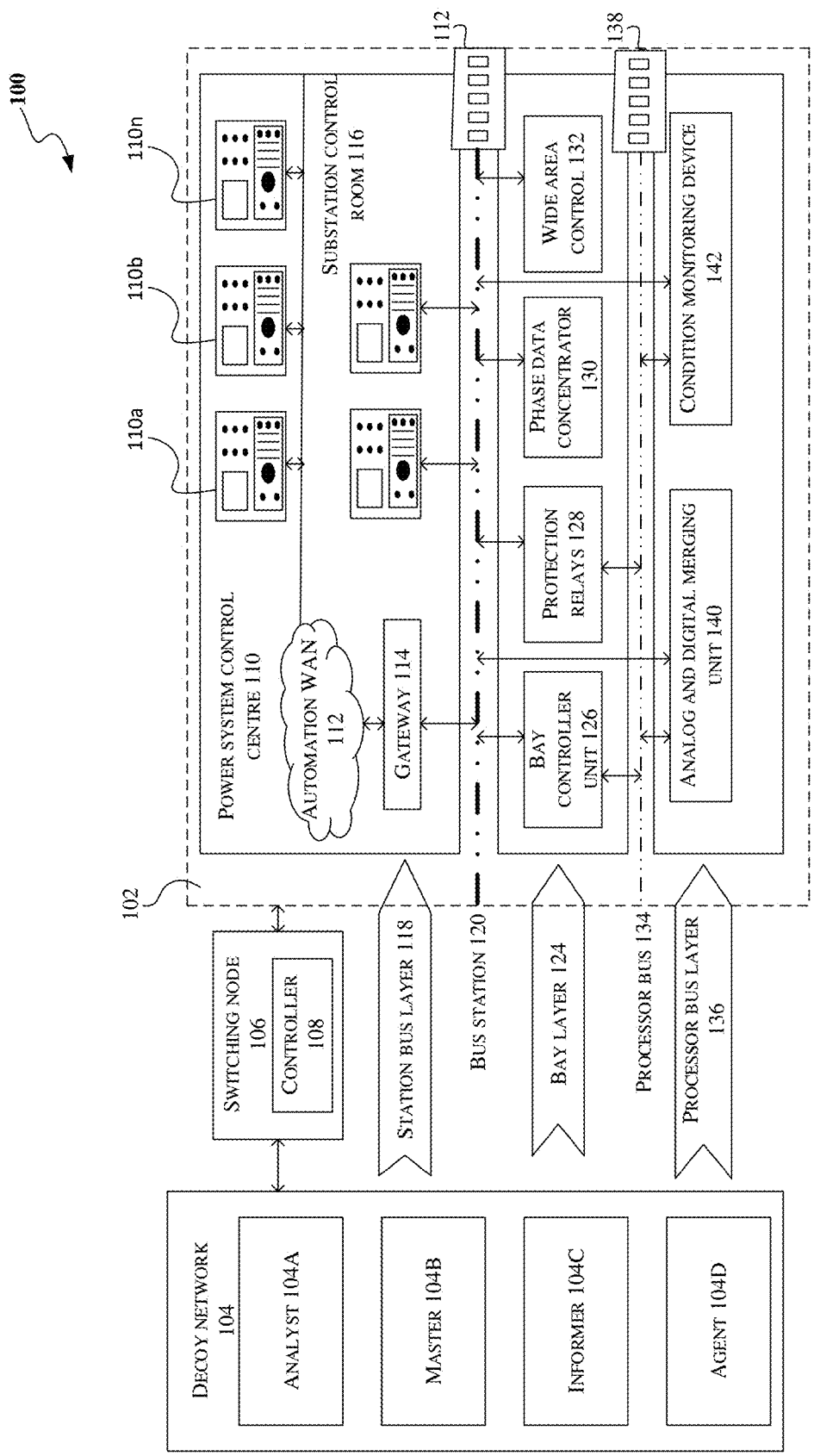
FIG. 1 illustrates an architecture for securing digital substations using a decoy network, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

While the disclosure is susceptible to various modifications and alternative forms, specific embodiments thereof have been shown by way of example in the FIGS. and will be described in detail below. It should be understood, however that it is not intended to limit the disclosure to the forms disclosed, but on the contrary, the disclosure is to cover all modifications, equivalents, and alternatives falling within the scope of the disclosure as defined by the appended claims.

Before describing detailed embodiments, it may be observed that the novelty and inventive step that are in accordance with the present disclosure resides in a decoy network including an agent and an informer that replicates behavior of a station bus layer and a process bus layer present in a substation communication network respectively. Particularly, the decoy network is a mirror of the substation communication network and is deployed to entertain one or more malicious attack requests received through an alien device. It is to be noted that a person skilled in the art can be motivated from the present disclosure and modify the various constructions of the decoy network. However, such modification should be construed within the scope of the present disclosure. Accordingly, the drawings are showing only one of the exemplary scenarios that is pertinent to understanding the embodiments of the present disclosure so as not to obscure the disclosure with details that will be readily apparent to those of ordinary skill in the art having benefit of the description herein.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", "include", "including", or any other variations thereof, are intended to cover a non-exclusive inclusion, such that a device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus.

The terms like "at least one" and "one or more" may be used interchangeably or in combination throughout the description.

The terms like "intelligent electronic devices" and "IEDs" may be used interchangeably or in combination throughout the description.

The terms like "switching node" and "mimic switch" may be used interchangeably or in combination throughout the description.

The terms like "decoy network" and "mimic network" may be used interchangeably or in combination throughout the description.

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present disclosure.

The present disclosure aims to overcome the issues with digital substations, in which microprocessor-based Intelligent Electronic Devices (IEDs) are used to control power system switching devices such as circuit breakers, reclosers, etc. With the standardization by the International Electrotechnical Commission (IEC) of the IEC 61850 process bus, most modern IEDs now support voltage and current inputs in a digital format, as Sampled Value (SV) streams transmitted as Ethernet packets on the process bus. In implementations according to the IEC61850-9-2 specifications, a merging unit (MU) is the device that samples the analog measurements (voltages and currents) of the primary high voltage power circuit, encodes the measurement values into Ethernet packets, and injects them onto the process bus. The IED receives these SV packets from the process bus, processes them, and uses the SV as the inputs to its various fault detection and protection functions.

However, IEC-61850 standard does not specify security features to address cyber threats on substation communication network. Thus, IEC-62351 standard was published to address this security gap in GOOSE. As per IEC 62351 recommendation, the use of encryption techniques for GOOSE are not recommended. Thus, an unencrypted communication channel exists between the substation devices making it vulnerable to cyber-attacks.

Thus, to overcome this problem, the present disclosure provides the decoy network to hide the IEC 61850 based communication packets from any attack that intendeds to manipulate the messages in the substation communication network. The decoy network may hide the critical MAC IDs from any attacker that intends to sniff packets, push malicious code, or collect data from the network. Further, the decoy network may hide the substation communication network from any attack that results in denial of service, flooding of network which impact the protection and control operation of the substation communication network.

Reference will now be made to the exemplary embodiments of the disclosure, as illustrated in the accompanying drawings. Wherever possible, same numerals will be used to refer to the same or like parts. Embodiments of the disclosure are described in the following paragraphs with reference to FIGS. 1-5.

FIG. 1 illustrates an architecture 100 for securing digital substations using a decoy network 104, in accordance with an embodiment of the present disclosure. As will become apparent in the description, the decoy network 104 is configured to detect and mitigate any type of malicious attacks or cyber-attacks on the digital substations. In an exemplary embodiment of the present disclosure, the digital substations correspond to electrical substations where operation is managed between distributed intelligent electronic devices (IEDs) interconnected by communications networks.

The architecture 100 includes, but may not be limited to, a substation communication network 102, the decoy network 104, and a switching node 106. In an embodiment of the present disclosure, the switching node 106 may include, but not limited to, a controller 108. Further, the controller 108 is configured to connect the decoy network 104 to the substation communication network 102. In an exemplary embodiment of the present disclosure, the controller 108 may include a processor such as a microprocessor or other control circuitry as should be evident to those in the art. The controller 108 may include memory (not shown) including non-volatile memory, such as electrically erasable programmable read-only memory (EEPROM) for storing and performing one or more commands.

Referring to FIG. 1, the substation communication network 102 is residing at or near the edge of an electrical distribution grid (not shown). In general, the electrical power grid consists of generating stations (power plants), transmission system and distribution system. In an embodiment of the present disclosure, the substation communication network 102 includes a power station control centre 110 and a substation control room 116. In an exemplary embodiment of the present disclosure, the power station control centre 110 includes a plurality of devices 110a, 110b, . . . 110n. The plurality of devices 110a, 110b, . . . 110n may include, but not limited to, feeder breakers and supply breakers, monitoring devices, control devices, switching devices, protection devices, and instrumentation devices.

In one embodiment of the present disclosure, the power station control centre 110 is configured to connect the plurality of devices 110a, 110b, . . . 110n with a plurality of IEDs 126, 128, 130, 132 via a station bus 120 with the help of a plurality of first switches 122. The plurality of devices 110a, 110b, . . . 110n is connected with the plurality of IEDs 126, 128, 130, 132 via a gateway 114 connected wirelessly with an automation WAN (Wide Area Network) 112. A person skilled in the art may easily understand the term "gateway" and "WAN". In an embodiment of the present disclosure, the plurality of IEDs 126, 128, 130, 132 is connected with other IEDs 140, 142 via a process bus 134 with the help of a plurality of second switches 138.

In an exemplary embodiment of the present disclosure, the plurality of IEDs are used to control power system switching devices such as circuit breakers, reclosers, etc. With the standardization by the International Electrotechnical Commission (IEC) of the IEC 61850 that defines communication protocols to provide communication between different equipment located in the substation communication network 102, such as protection, control, and measurement equipment, as well as (IEDs) intelligent electronic devices. In an exemplary embodiment of the present disclosure, the IEC 61850 aims to provide interoperability, a key concept to allow for the integration and management of equipment from different manufacturers.

In an exemplary embodiment of the present disclosure, the IEC 61850 defines three level, where each level contains different devices. The three level includes a process level, a bay level, and a station level. By the way of example with no limitation, the process level includes different devices such as, switchgears, circuit breakers, switches, a current transformer, and a voltage transformer. Further, the bay level includes IEDs. In an embodiment of the present disclosure, the IEC 61850 defines that the bay level may use a process bus to allow communications between IEDs, and intelligent instruments and switchgears. By the way of example with no limitation, the station level includes SCADA and HMI (Human Machine Interface) systems used for substation control and monitoring. Further, the station level uses the station bus to be able to communicate with the IEDs located in the bay level.

In an exemplary embodiment of the present disclosure, the IEC 61850 may include different applications such as, MMS (Manufacturing Messaging Specification), GOOSE (Generic Object-Oriented Substation Events), SMV (Sampled Measured Values), and the like. In one exemplary embodiment, MMS is widely used for communication between the IEDs and SCADA system for application, configuration, and monitoring data exchange. In another exemplary embodiment, GOOSE is used to send messages regarding the status between IEDs. Frequently used for tele protection tripping. In yet another exemplary embodiment, SMV provides fast and reliable communication of measurement, protection and control values of power systems mostly from CT (current transformers) and VT (voltage transformers).

Referring to FIG. 1, the substation control room 116 performs various functions in the substation communication network 102 such as, data collection, scanning, event reporting and recording, voltage control, power control, frequency control, other automatic and semiautomatic controls, and the like. These various functions are performed on the plurality of devices 110a, 110b, . . . 110n of the power system control centre 110. The substation control room 116 is electrically connected to the plurality of IEDs (126, 128, 130, 132) through the station bus 120 with the help of the plurality of first switches 122.

In an exemplary embodiment of the present disclosure, the substation communication network 102 corresponds to the digital substation. The substation communication network 102 may adopt a three-level and two-network structure, including a station bus layer 118, a bay layer 124, a process bus layer 136, the station bus 120, and the process bus 134. In an embodiment of the present disclosure, the plurality of IEDs 126, 128, 130, 132 in the bay layer 124 is interconnected with that in the station bus layer 118 and in the process bus layer 136 via the station bus 120 and the process bus 136, respectively. The plurality of IEDs 126, 128, 130, 132 in the bay layer 124 may include, but not limited to, bay controller units 126, protection relays 128, phase data concentrator 130, and wide area control 132. The process bus layer 136 includes the other IEDs 140, 142 such as, analog and digital merging units 140, condition monitoring devices 142, and the like.

The plurality of IEDs is generally configured to monitor voltages and currents, communicating sampled values (SVs) on the process bus 134. In an exemplary embodiment of the present disclosure, the substation communication network 102 involve the use of a sufficiently large number of merging units (MU) and the plurality of IEDs. Further, data transfer between the merging units and the plurality of IEDs are carried out through the Local Area Network (LAN) using the SV and GOOSE protocols.

In an embodiment of the present disclosure, the substation communication network 102 is connected to the decoy network 104 though the controller 108. Particularly, the controller 108 is configured via the switching node 106 to connect the decoy network 104 with the station bus layer 118, the bay layer 124, and the process bus layer 136, of the substation communication network 102. In an embodiment of the present disclosure, the decoy network 104 may include, but not limited to, an analyst 104A, a master 104B, an informer 104C, and an agent 104D. In an embodiment of the present disclosure, the decoy network 104 is deployed to entertain the one or more malicious attack requests received through the alien device. A person skilled in the art would understand that the term "alien device" is basically "an attacker" who is intended to manipulate substation communication network packets though cyber threats.

In an embodiment of the present disclosure, various data from the substation communication network 102 is received by the analyst 104A. The analyst 104A is configured to analyse measured values of the plurality of devices 110a, 110b, . . . 110n located under the station bus layer 118. Further, the master 104B is at the station bus layer 118, i.e., the substation control room 116.

Furthermore, the agent 104D is configured to mimic the process bus layer 136 communication network with SV (Sampled Values) messages and GOOSE. Moreover, the informer 104C is configured to mimic the bay layer 124 communication network with the plurality of IEDs connected to the switching mode 106 and communicating with GOOSE and MMS messages. The master 104B initiates an incidence response plan and maintains alarms and event logs of the agent 104D and the informer 104C.

In an embodiment of the present disclosure, the agent 104D and the informer 104C are configured to replicate behavior of the station bus layer 118 and the process bus layer 136 present in the substation communication network 102, respectively. Further, the station bus layer 118 and the process bus layer 136 are connected to the plurality of IEDs.

In an embodiment, the controller 108 may be configured to create a plurality of bogus medium access control (MAC) IDs, resembling similar to a plurality of critical media access control (MAC) IDs exchanged between the plurality of intelligent electronic devices (IEDs) present in the substation communication network 102. Further, the controller 108 may provide the plurality of bogus MAC IDs to the decoy network 104 communicating with the alien device (not shown in figure).

Furthermore, the controller 108 may detect the one or more malicious attack requests received from the alien device to monitor an unauthorized access to the substation communication network 102. The unauthorized access to the substation communication network 102 is detected based on comparing IP address and MAC address of the alien device with a pre-established access control whitelist. Most importantly, if the IP address and the MAC address of the alien device does not match with the to the pre-established access control whitelist, the controller 108 may determine the IP address, the MAC address as a suspicious IP address, the MAC address. In other words, the controller 108 may detect one or more requests generated by the suspicious IP address and MAC address as the unauthorized access to the substation communication network 102.

In response to detection of the one or more malicious attack requests, the controller 108 may switch the substation communication network 102 to the decoy network 104 for displaying a set of bogus MAC IDs to the alien device depending on type of the one or more attack requests. Further, the controller 108 may determine one or more attack features based on activity performed by the alien device in response to the set of bogus MAC IDs. Further, the activity performed by the alien device in response to the set of bogus MAC IDs is either manipulation of the bogus MACIDs of the decoy network 104 or deletion of the bogus MAC IDs of the decoy network 104.

In an embodiment of the present disclosure, the controller 108 may activate the decoy network 102 only in response to the one or more malicious attack requests detected from the alien device. Further, the activated decoy network is configured to interact with the alien device using the plurality of bogus MAC IDs. In an embodiment of the present disclosure, the controller 108 may provide delay in responding to the one or more malicious attack requests, upon determination of the one or more attack features. Based on determination of the one or more attack features, the controller 108 may evaluate an attack plan and/or the plurality of IEDs to be targeted by the alien device.

In an embodiment of the present disclosure, the controller 108 is further configured to alter the plurality of bogus MAC IDs periodically to provide illusion of dynamic nature of the substation communication network 102 to the alien device. For example, the controller 108 may generate the fresh bogus MAC IDs every week to give illusion of real network to the attacker operating the alien device. In an embodiment, the controller 108 may generate the fresh bogus MAC IDs every time the actual/real network performs any update or change. In another embodiment, the controller 108 may generate the fresh bogus MAC IDs only when there is a major change happen in corresponding actual/real network. However, it is not a necessary condition to generate fresh bogus MAC IDs, sometimes shuffling of the earlier MAC IDs may also work.

Figure 2:
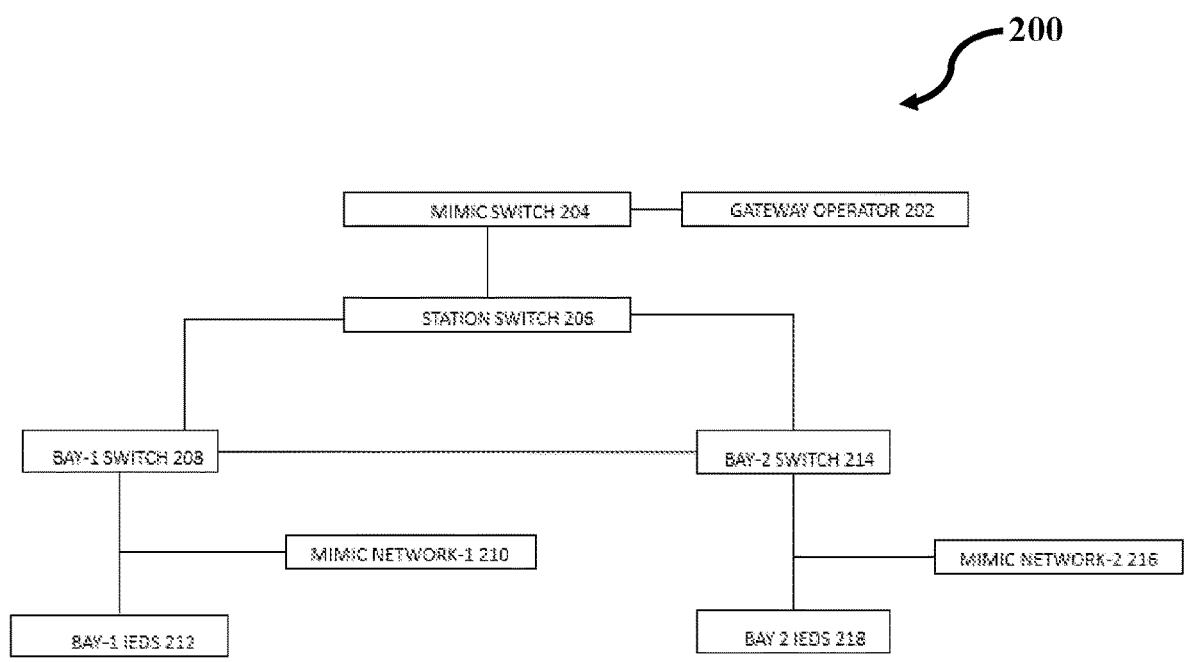
FIG. 2 illustrates a block diagram of a substation network architecture, in accordance with an embodiment of the present disclosure.

FIG. 2 illustrates a block diagram 200 of a substation network architecture, in accordance with an embodiment of the present disclosure. FIG. 2 is explained in conjunction with FIG. 1. The substation network architecture may include, but not limited to, gateway operator 202, a mimic switch 204, a station switch 206, bay-1 switch 208, bay 2 switch 214, bay-1 IEDs 212, and bay 2-IEDs 218. In an embodiment of the present disclosure, the gateway operator 202 is electrically connected to the station switch 206 via the mimic switch 204. The term "switching node" and "mimic switch" may be used interchangeably or in combination throughout the description.

The mimic switch 204 is introduced between the gateway operator 202 and the station switch 206 to hide the IEC 61850 based communication packets from any attack intended to manipulate any messages in the substation communication network 102 of FIG. 1. In an embodiment of the present disclosure, a mimic network-1 210 is introduced between the Bay-1 switch 208 and Bay-1 IEDs 212. Likewise, a mimic network-2 216 is introduced between the Bay-2 switch 214 and Bay-2 IEDs 218. The mimic network-1 210 and mimic network-2 216 are introduced as a mirror of Bay-1 and Bay-2 networks and is deployed to entertain the one or more malicious attack requests received through the alien device.

Figure 3A:
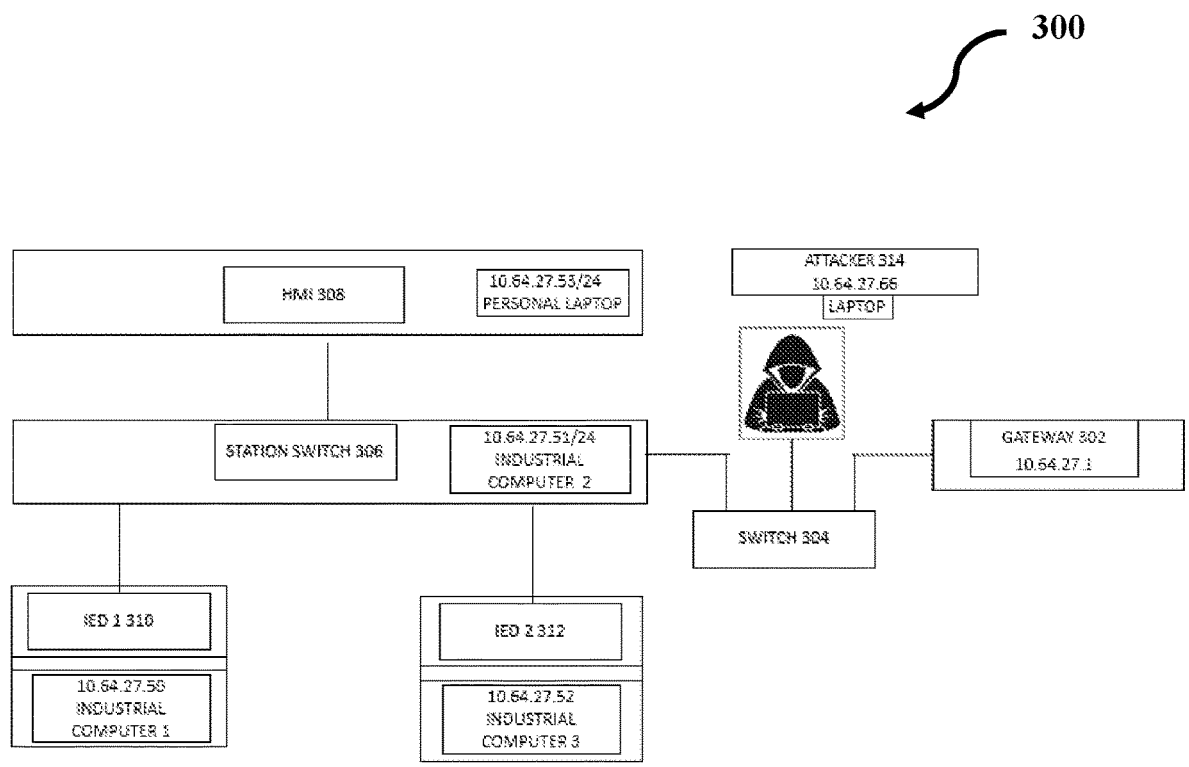
FIGS. 3a-3b illustrates a block diagram of a substation communication network attacked by an attacker, in accordance with an embodiment of the present disclosure.
Figure 3B:
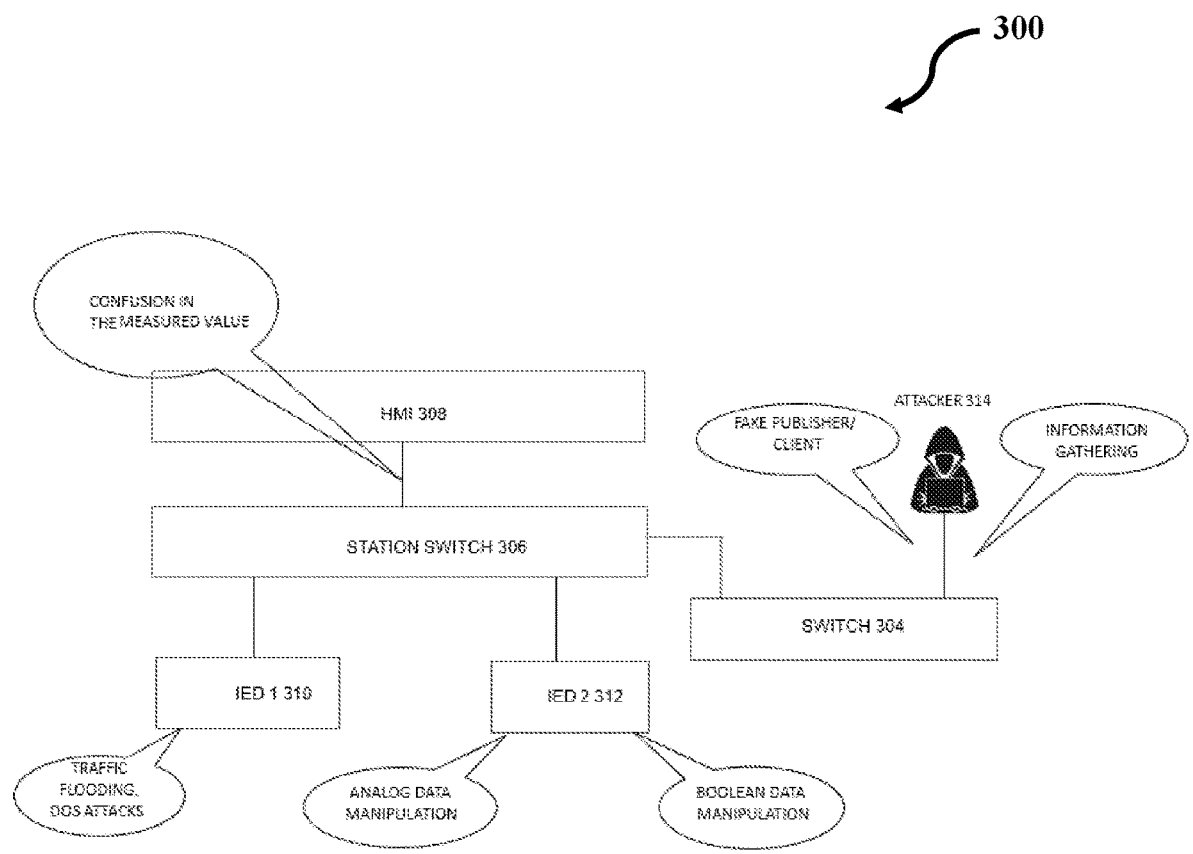

FIGS. 3a-3b illustrate a block diagram 300 of the substation communication network 102 of FIG. 1, attacked by an attacker 314, in accordance with an embodiment of the present disclosure. The substation communication network 102 may include, but not limited to, HMI 308, a station switch 306, switch 304, gateway 302. The gateway 302 may be electrically connected to the station switch 306 via the switch 304. A person skilled in the art may understand that the term switch referred to here is a network switch. In an embodiment of the present disclosure, the station switch 306 provides connectivity to a plurality of IEDs such as IED 1 310 and IED 2 312. In an exemplary embodiment of the present disclosure, the IED 1 310 may include Analog publisher. In another exemplary embodiment of the present disclosure, the IED 2 312 may include Analog subscriber and Boolean publisher. Referring to FIG. 3a, the attacker 314 may directly attack the switch 304 to perform any malicious act. A person skilled in art may understand that the attacker may be any hacker whose intention is to manipulate and hack the system through illegal activities. The attacker 314 may attack the substation communication network 102 using the plurality of critical MAC IDs. In particular, the attacker 314 may attack to sniff packets, push malicious code, or collect data by attacking the plurality of critical MAC IDs of the plurality of IEDs though the switch 304. Referring to FIG. 3b, the attacker 314 may create a plurality of fake or bogus MAC IDs to attack the substation communication network 102. Particularly, the attacker 314 may attack using fake publisher/client and attack the IED 1 310 and the IED 2 312. Further, the attacker 314 may gather information by manipulating Boolean data and analog data associated with the IED 2 312. Furthermore, the attacker 314 may attack IED 1 310 in form of traffic flooding and DoS (Denial of Service) attacks. Moreover, the attacker 314 may create confusion in the values measured by the HMI (Human-Machine Interface) 308 and station switch 306.

Figure 4A:
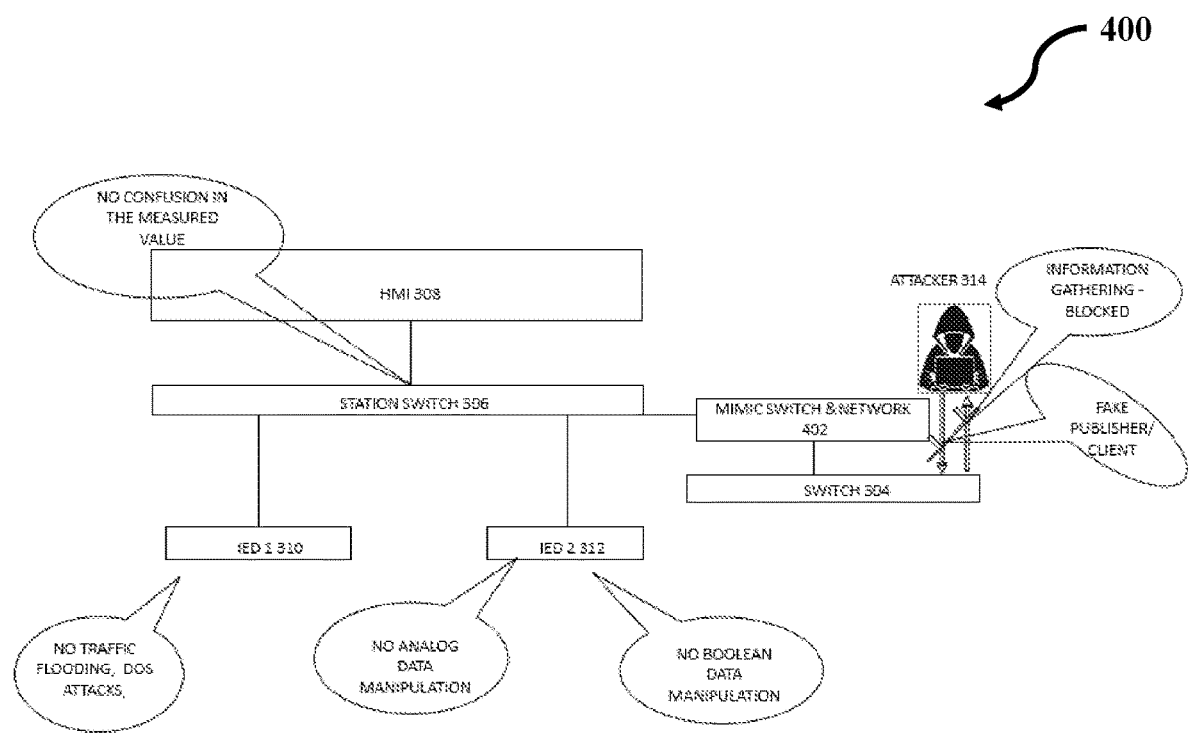
FIGS. 4a-4b illustrates a system interactive environment for securing the substation communication network using a decoy switch and network, in accordance with an embodiment of the present disclosure.
Figure 4B:
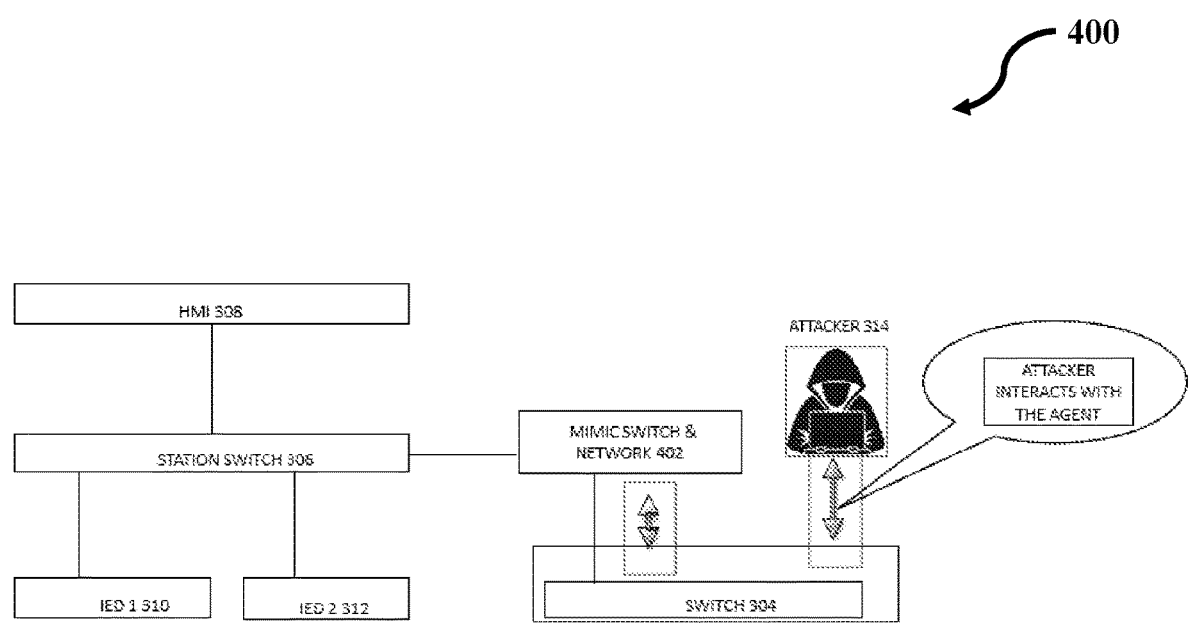

FIGS. 4a-4b illustrates a system interactive environment 400 for securing the substation communication network 102 of FIG. 1 using a decoy switch and network, in accordance with an embodiment of the present disclosure. The FIG. 4 is explained in conjunction with FIGS. 1-3(a-c). Referring to FIG. 4a-4b, the decoy switch and network corresponds to mimic switch and network. While referring to description for FIGS. 3a-3c, the mimic switch and network 402 is introduced between the switch 304 and the station switch 306. The mimic switch and network 402 may create the plurality of bogus medium access control (MAC) IDs, resembling similar to the plurality of critical media access control (MAC) IDs exchanged between the plurality of intelligent electronic devices (IEDs) present in the substation communication network 102. In response to the plurality of bogus MAC IDs, the attacker 314 may not be able to gather any information from the substation communication network packets i.e., the information gathered may be blocked. The attacker 314 may interact with the agent 104D of FIG. 1, instead of interacting directly with the switch 304.

Once the attacker and the attacker plan is identified by the mimic switch and network 402, accordingly the master 104B present in the system may initiate a response plan. The response plan may include providing fake information to the alien device, blocking the access of alien device, reporting about the attack to authorities etc. The master 104B set the alarm for such attacks along with initiation of response plan, it also maintains the event logs of the agent and the informer and.

Figure 5:
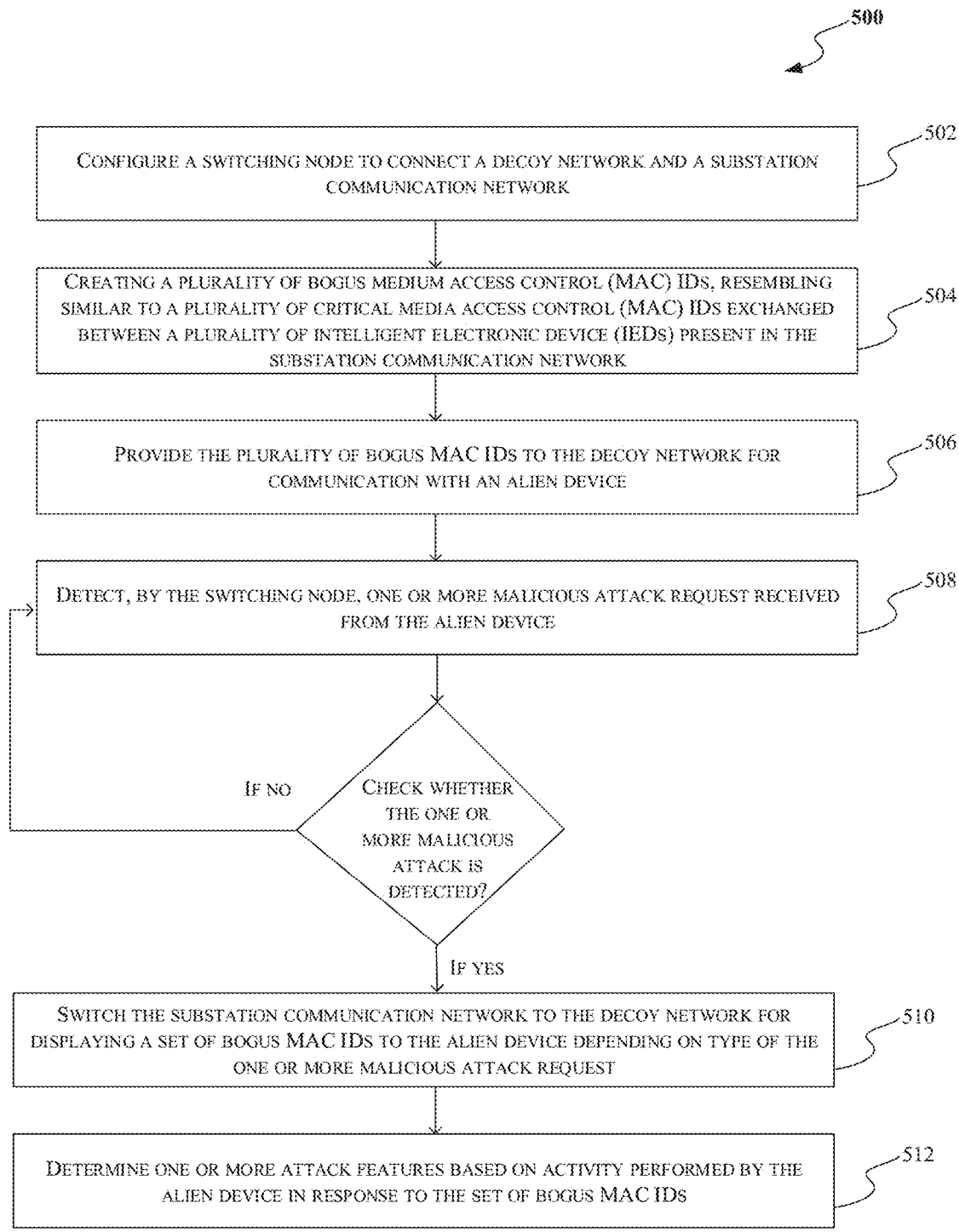
FIG. 5 depicts a method for securing the digital substations, in accordance with an embodiment of the present disclosure.

FIG. 5 depicts a method 500 for securing digital substations, in accordance with an embodiment of the present disclosure.

As illustrated in FIG. 5, the method 500 includes one or more blocks activating the decoy network 104 only in response to the one or more malicious attack requests detected from the alien device.

At step 502, the method includes configuring the switching node 106 to connect the decoy network 104 and the substation communication network 102. The decoy network 104 is the mirror of the substation communication network 102 and is deployed to entertain the one or more malicious attack requests received through the alien device. The decoy network 102 includes the analyst 104A, the master 104B, the informer 104C, and the agent 104D. The agent 104D and the informer 104C are configured to replicate behavior of the station bus layer 118 and the process bus layer 136 present in the substation communication network 102 respectively. The informer 104C mimics the station bus layer 120, where the plurality of IEDs is connected to the network switch and communicates with Generic Object Oriented Substation Events (GOOSE) and Manufacturing Message Specification (MMS) messages. The agent 104D mimics the process bus layer 136 with Sampled Value (SV) messages and Generic Object Oriented Substation Events (GOOSE). The master 104B, at the station bus layer 120, initiates the response plan upon detection of the one or more malicious attacks and maintains alarm and event logs of the agent 104D and the informer 104C. The station bus layer 120 and the process bus layer 136 are connected to the plurality of Intelligent Electronic Devices (IEDs). The plurality of IEDs includes the at least one bay controller unit 126, the at least one protection relay 128, the phase data concentrator 130, the wide area control unit 132, the analog and digital measuring unit 140, and the at least one condition monitoring device 142.

At step 504, the method includes creating the plurality of bogus medium access control (MAC) IDs, resembling similar to the plurality of critical media access control (MAC) IDs exchanged between the plurality of intelligent electronic devices (IEDs) present in the substation communication network 102. In an embodiment of the present disclosure, the plurality of bogus MAC IDs are altered periodically to provide illusion of dynamic nature of the substation communication network to the alien device. In an exemplary embodiment, the plurality of bogus MAC IDs are altered in a week. In an exemplary embodiment, the plurality of bogus MAC IDs are altered in a month time. In an exemplary embodiment, the plurality of bogus MAC IDs are altered when there is an update performed between the plurality of intelligent electronic devices (IEDs) present in the substation communication network 102. In an embodiment of the present disclosure, the activity performed by the alien device in response to the set of bogus MAC IDs is either manipulation or deletion of the bogus MAC IDs of the decoy network 104.

At step 506, the method includes providing the plurality of bogus MAC IDs to the decoy network 104 for communicating with the alien device.

At step 508, the method includes detecting, by the switching node 106, the one or more malicious attack requests received from the alien device. In response to detection of the one or more malicious attack requests, the switching node 106 may switch the substation communication network 102 to the decoy network 104 for displaying the set of bogus MAC IDs to the alien device depending on type of the one or more malicious attack requests. Further, the switching node 106 may determine the one or more attack features based on activity performed by the alien device in response to the set of bogus MAC IDs. In an embodiment of the present disclosure, the detection of the one or more malicious attack requests is performed by monitoring the unauthorized access to the substation communication network 102. Further, the unauthorized access to the substation communication network 102 is detected based on comparing internet Protocol (IP) address and MAC address of the alien device with the pre-established access control whitelist. And if the IP address and the MAC address of the alien device does not belong to the pre-established access control whitelist, the switching node 106 may determine the IP address, the MAC address as the suspicious IP address, the MAC address. Furthermore, the switching node 106 may detect the one or more requests generated by the suspicious IP address and MAC address as the unauthorized access to the substation communication network 102.

The order in which the method 500 is described is not intended to be construed as a limitation, and any number of the described method blocks may be combined in any order to implement the method. Additionally, individual blocks may be deleted from the methods without departing from the spirit and scope of the subject matter described.

Accordingly, the present disclosure provides below mentioned advantages:

1) The present disclosure provides the decoy network. The decoy network may hide the IEC 61850 based communication packets from any attack intended to manipulate the messages in the substation communication network.
2) The decoy network may hide the critical MAC IDs from any attacker that intends to sniff packets, push malicious code, or collect data from the network.
3) The decoy network may hide the network from any attack that results in denial of service, flooding of network which impact the protection and control operation of the network.
4) The decoy network may lure the attacker in all the aforementioned cases to a mimic as a low interaction decoy.
5) Upon being attack, a high interaction defensive decoy network is then activated to interact with the attacker and execute behavioural identification of the attacker.

A description of an embodiment with several components in communication with each other does not imply that all such components are required. On the contrary, a variety of optional components are described to illustrate the wide variety of possible embodiments of the disclosure. Further, there are other components also present in the substation communication network, however, these are not presented in the description to focus on the main features of the invention.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Reference Numerals: | |
| --- | --- |
| Reference Numeral | Description |
| 100 | An architecture for securing digital substations using a decoy network |
| 102 | Substation communication network |
| 104 | Decoy network |
| 104A | Analyst |
| 104B | Master |
| 104C | Informer |
| 104D | Agent |
| 106 | Switching node |
| 108 | Controller |
| 110 | Power system control centre |
| 110a, 110b, . . . 110n | A plurality of devices |
| 112 | Automation WAN |
| 114 | Gateway |
| 116 | Substation control room |
| 118 | Station bus layer |
| 120 | Station bus |
| 122 | a plurality of first switches |
| 124 | Bay layer |
| 126 | Bay controller units |
| 128 | Protection relays |
| 130 | Phase data concentrator |
| 132 | Wide Area Control |
| 134 | Process bus |
| 136 | Process bus layer |
| 138 | A plurality of second switches |
| 140 | Analog and digital merging units |
| 142 | Condition monitoring |
| 200 | A block diagram of a substation network architecture |
| 202 | Gateway Operator |
| 204 | Mimic Switch |
| 206 | Station Switch |
| 208 | Bay-1 switch |
| 210 | Mimic Network-1 |
| 212 | Bay-1 IEDs |
| 214 | Bay-2 Switch |
| 216 | Mimic Network-2 |
| 218 | Bay-2 IEDs |
| 300 | A substation communication network |
| 302 | Gateway |
| 304 | Switch |
| 306 | Station Switch |
| 308 | Human Machine Interface (HMI) |
| 310 | IED 1 |
| 312 | IED 2 |
| 314 | Attacker |
| 400 | A system interactive environment |
| 402 | Mimic switch and network |
| 500 | A method for method for securing digital substation |
| 502-512 | Method steps |

The invention claimed is:

1. A method for securing digital substation, the method comprising:
configuring a switching node to connect a decoy network and a substation communication network, wherein the decoy network is a mirror of the substation communication network and is deployed to entertain one or more malicious attack requests received through an alien device;
creating a plurality of bogus medium access control (MAC) IDs, resembling similar to a plurality of critical media access control (MAC) IDs exchanged between a plurality of intelligent electronic devices (IEDs) present in the substation communication network;
providing the plurality of bogus MAC IDs to the decoy network for communicating with the alien device, wherein the plurality of bogus MAC IDs is altered periodically to provide illusion of dynamic nature of the substation communication network to the alien device;

detecting, by the switching node, the one or more malicious attack requests received from the alien device; and in response to detection of the one or more malicious attack requests:

switching the substation network to the decoy network for displaying a set of bogus MAC IDs to the alien device depending on type of the one or more malicious attack requests; and determining one or more attack features based on activity performed by the alien device in response to the set of bogus MAC IDs.

2. The method as claimed in claim 1, wherein detecting the one or more malicious attack requests is performed by monitoring an unauthorized access to the substation communication network, wherein the unauthorized access to the substation communication network is detected based on comparing internet Protocol (IP) address and MAC address of the alien device with a pre-established access control whitelist, and if the IP address and the MAC address of the alien device does not belong to the pre-established access control whitelist, determining the IP address, the MAC address as a suspicious IP address, an MAC address and detecting one or more requests generated by the suspicious IP address and MAC address as the unauthorized access to the substation communication network.

3. The method as claimed in claim 1, wherein the decoy network comprises an agent and an informer to replicate behaviour of a station bus layer and a process bus layer present in the substation communication network respectively, wherein the station bus layer and the process bus layer are connected to a plurality of Intelligent Electronic Devices (IEDs), and wherein the plurality of IEDs comprises at least one bay controller unit, at least one protection relay, a phase data concentrator, a wide area control unit, analog and digital measuring unit, and at least one condition monitoring device.

4. The method as claimed in claim 1, further comprising:

activating the decoy network only in response to the one or more malicious attack requests detected from the alien device, wherein the activated decoy network is configured to interact with the alien device using the plurality of bogus MAC IDs, and delaying response to the one or more malicious attack requests based on the determination of the one or more attack features, wherein the one or more attack features are determined to evaluate an attack plan and/or the plurality of IEDs to be targeted by the alien device.

5. The method as claimed in claim 1, wherein the activity performed by the alien device in response to the set of bogus MAC IDs is either manipulation or deletion of the bogus MAC IDs of the decoy network.

6. The method as claimed in claim 1, wherein the decoy network comprises an analyst, a master, an informer, and an agent.

7. The method as claimed in claim 6, wherein the informer mimics a station bus layer, where the plurality of IEDs is connected to a network switch and communicates with Generic Object Oriented Substation Events (GOOSE) and Manufacturing Message Specification (MMS) messages.

8. The method as claimed in claim 6, wherein the agent mimics a process bus layer with Sampled Value (SV) messages and Generic Object Oriented Substation Events (GOOSE).

9. The method as claimed in claim 6, wherein the master, at a station bus layer, initiates a response plan upon detection of the one or more malicious attacks and maintains alarm and event logs of the agent and the informer.

10. A switching node for securing digital substations, the node comprises: a controller configured to:

connect a decoy network and a substation communication network, wherein the decoy network is a mirror of the substation communication network and is deployed to entertain one or more malicious attack requests received through an alien device;

create a plurality of bogus medium access control (MAC) IDs, resembling similar to a plurality of critical media access control (MAC) IDs exchanged between a plurality of intelligent electronic devices (IEDs) present in the substation communication network;

provide the plurality of bogus MAC IDs to the decoy network for communicating with the alien device, wherein the plurality of bogus MAC IDs is altered periodically to provide illusion of dynamic nature of the substation communication network to the alien device;

detect the one or more malicious attack requests received from the alien device; and in response to detection of the one or more malicious attack requests, the controller is further configured to:

switch the substation communication network to the decoy network for displaying a set of bogus MAC IDs to the alien device depending on type of the one or more attack requests; and determine one or more attack features based on activity performed by the alien device in response to the set of bogus MAC IDs.

11. The switching node as claimed in claim 10, wherein to detect the one or more malicious attack requests, the controller is further configured to monitor an unauthorized access to the substation communication network, and wherein the unauthorized access to the substation communication network is detected based on comparing IP address and MAC address of the alien device with a pre-established access control whitelist, and if the IP address and the MAC address of the alien device does not match with the to the pre-established access control whitelist, determining the IP address, the MAC address as a suspicious IP address, an MAC address and detecting one or more requests generated by the suspicious IP address and MAC address as the unauthorized access to the substation communication network.

12. The switching node as claimed in claim 10, wherein the decoy network comprises an agent and an informer to replicate behaviour of a station bus layer and a process bus layer present in the substation communication network respectively, wherein the station bus layer and the process bus layer are connected to a plurality of Intelligent Electronic Devices (IEDs), and wherein the plurality of IEDs comprises at least one bay controller unit, at least one protection relay, a phase data concentrator, a wide area control unit, analog and digital measuring unit, and at least one condition monitoring device.

13. The switching node as claimed in claim 10, wherein the controller is further configured to: activate the decoy network only in response to the one or more malicious attack requests detected from the alien device, wherein the activated decoy network is configured to interact with the alien device using the plurality of bogus MAC IDs, wherein upon determination of the one or more attack features, the controller is further configured to provide delay in responding to the one or more malicious attack requests, and wherein by determining the one or more attack features, the controller is configured to evaluate an attack plan and/or the plurality of IEDs to be targeted by the alien device.

14. The switching node as claimed in claim 10, wherein the activity performed by the alien device in response to the set of bogus MAC IDs is either manipulation of the bogus MACIDs of the decoy network or deletion of the bogus MAC IDs of the decoy network.

15. The switching node as claimed in claim 10, wherein the decoy network comprises an analyst, a master, an informer, and an agent.

16. The switching node as claimed in claim 15, wherein the informer is configured to mimic a station bus layer, where the plurality of IEDs is connected to a network switch and communicates with Generic Object Oriented Substation Events (GOOSE) and Manufacturing Message Specification (MMS) messages.

17. The switching node as claimed in claim 15, wherein the agent is configured to mimic a process bus layer with Sampled Value (SV) messages and Generic Object Oriented Substation Events (GOOSE), and
   wherein the master is configured to initiate a response plan upon detection of the one or more malicious attacks and maintains alarm and event logs of the agent and the informer.

18. A system for securing digital substations, the system comprises:
   a substation communication network comprising a station bus layer and a process bus layer, wherein the station bus layer and the process bus layer are connected to a plurality of Intelligent Electronic Devices (IEDs);
   a decoy network comprising an agent and an informer to replicate behaviour of the station bus layer and the process bus layer present in the substation communication network respectively, wherein the decoy network is a mirror of the substation communication network and is deployed to entertain one or more malicious attack requests received through an alien device;
   a switching node coupled to the substation communication network and the decoy network, wherein the switching node is configured to:
   create a plurality of bogus medium access control (MAC) IDs, resembling similar to a plurality of critical media access control (MAC) IDs exchanged between a plurality of intelligent electronic devices (IEDs) present in the substation communication network;
   provide the plurality of bogus MAC IDs to the decoy network for communicating with the alien device, wherein the plurality of bogus MAC IDs is altered periodically to provide illusion of dynamic nature of the substation communication network to the alien device;
   detect the one or more malicious attack requests received from the alien device; and
   in response to detection of the one or more malicious attack requests, the switching node is further configured to:
   switch the substation communication network to the decoy network for displaying a set of bogus MAC IDs to the alien device depending on type of the one or more attack requests; and
   determine one or more attack features based on activity performed by the alien device in response to the set of bogus MAC IDs.

* * * * *